United States Patent
Gavin

(10) Patent No.: US 9,739,042 B1
(45) Date of Patent: Aug. 22, 2017

(54) WATER DISPOSABLE SYSTEM USING UNWANTED WATER

(71) Applicant: Kim Gavin, Marysville, WA (US)

(72) Inventor: Kim Gavin, Marysville, WA (US)

(73) Assignee: Kim Gavin, Marysville, WA (US)

(*) Notice: Subject to any disclaimer, the term of this patent is extended or adjusted under 35 U.S.C. 154(b) by 0 days.

(21) Appl. No.: 15/050,493

(22) Filed: Feb. 23, 2016

(51) Int. Cl.
| E03D 1/00 | (2006.01) |
| E03D 5/00 | (2006.01) |
| E03D 1/14 | (2006.01) |
| E03D 1/32 | (2006.01) |
| E03D 1/33 | (2006.01) |
| E03B 1/04 | (2006.01) |

(52) U.S. Cl.
CPC ............ E03D 5/006 (2013.01); E03B 1/042 (2013.01); E03D 1/142 (2013.01); E03D 1/32 (2013.01); E03D 1/33 (2013.01); E03B 2001/045 (2013.01)

(58) Field of Classification Search
CPC .......... E03D 5/006; E03D 1/142; E03B 1/042
USPC ..................................................... 4/314, 415
See application file for complete search history.

(56) References Cited

U.S. PATENT DOCUMENTS

| 3,188,656 | A | * | 6/1965 | Drager | E03D 1/003 4/415 |
| 4,358,864 | A | * | 11/1982 | Medrano | E03D 1/003 4/346 |
| 5,277,218 | A | * | 1/1994 | Sanchez | E03B 1/042 137/268 |
| 6,276,005 | B1 | * | 8/2001 | Sanders | E03D 5/003 137/403 |
| 2006/0144769 | A1 | * | 7/2006 | Okros | E03B 1/04 210/123 |

* cited by examiner

*Primary Examiner* — Huyen Le

(57) ABSTRACT

The present invention relates to a water disposable system comprised of a connecting member having first side connected to at least one unwanted water source and one valve to control the flow of an unwanted water. A toilet water tank is connected a second side of the connecting member, wherein the water tank comprises: a strainer in a stand pipe; a two float system, wherein a first float is set at a minimum tank volume water line, and a second float set at maximum tank volume water line. A button is coupled with a second float allowing the intake of the fresh water from the fresh water pipe upon actuation. A transparent window or gauge is positioned on the front wall of the tank for determining the volume of water in the toilet tank.

9 Claims, 2 Drawing Sheets

WATER DISPOSABLE SYSTEM USING UNWANTED WATER

FIELD OF THE INVENTION

The main objective of the present invention is to conserve the use of fresh water and electricity by utilizing unwanted water and gray-water sources within the home to operate a flushing toilet, whilst allowing the user to utilize fresh water service on demand.

BACKGROUND OF THE INVENTION

For a long time the conservation of water has been in demand. The efficient use of fresh water is a need of the hour. Much of the potable water that is supplied to a home or business by a freshwater line is used to dispose of waste. Therefore, technologies such as gray-water reclamation or reuse of unwanted water have evolved to avoid unnecessary waste of potable water. These technologies enable the user to either reuse the unwanted water as it is, or treat the unwanted water and then use it again.

Various inventions has been made in this field, wherein there are number of water disposable system available for reusing the unwanted water without treatment. Some of the known prior arts of this field are U.S. Pat. No. 6,328,882, U.S. Pat. No. 5,845,346, U.S. Pat. No. 6,355,160, US20070174959, U.S. Pat. No. 8,931,122, U.S. 60/763,838 and U.S. Pat. No. 6,276,005. All of the above mentioned prior arts disclose the use of unwanted water in holding tanks, toilets or in lawns. Though there are many references to the use of gray-water in a toilet system, these systems specifically deal in the storage of gray-water in a holding tank or only utilizing gray-water and not other unwanted water sources.

Therefore, there remains a need of such a water disposable system which provides a solution for using the unwanted water without treatment, eliminates the need for holding tanks and pumps in order to function, allows for use of fresh water when desired and also maximizes on other sources of unwanted water in the home.

Heated fresh water delivered down a hot water line will sit in the pipe or conduit until a faucet or outlet down line is opened. The water between the water heating source and the outlet is often cool and is unwanted, this unwanted water is then allowed to pass into the drain unused until heated water reaches the outlet. For example, when a user is waiting for hot water to become available in the bath or shower the hot water is turned on and any cold water that comes from the tap is allowed to run into the sewage unused until water of the desired temp begins to flow from the tap. Therefore there, is opportunity to make use of this unwanted water in the operation of a toilet.

SUMMARY OF THE PRESENT INVENTION

The main objective of the present invention is to overcome the limitations of the prior arts by providing a waste disposal system which provides a unique and useful method for utilizing gray-water and unwanted water in a toilet system while also providing the full function of a toilet when unwanted and gray water is not available.

In order to achieve the above mentioned objective, a water disposable system comprises a connecting member having a first side of the connecting member which is connected to at least one unwanted water source which feeds unwanted water to the toilet tank via gravity and further comprises at least one valve to control the flow of unwanted water. The water tank of the toilet is connected to a second side of the connecting member to receive unwanted water and is further enabled to receive fresh water from a fresh water pipe. The water tank comprises a strainer and a standpipe to refill the toilet bowl and the tank simultaneously whilst preventing debris from clogging the small ports within the rim of the toilet bowl. A flushing lever and a second end of the lever is coupled with a rubber flap via a chain with a small float attached at the minimum water line. The purpose of the rubber flap is to allow sufficient water into the bowl in order to flush waste, and the small float attached to the chain is to maintain tension on the chain keeping the flap open when only a small amount of water is available and to allow efficient flushing. Fresh water is maintained at a minimum in the tank by the use of two floats in communication with respective levers to allow fresh water to enter the toilet tank up to a preset volume by water level within the tank. The first float is situated at a lower height within the tank to maintain the minimum volume of water required to flush waste. The second float is situated at a higher height to maintain the maximum volume of water required to flush waste. The operation of the second float can be suspended, allowing empty volume in the toilet tank to be filled by unwanted or gray-water as it becomes available from the attached sources. Further, a button, wherein a first end of the button is enabled to be actuated by the user and a second end of the button is coupled with a second float, wherein the second float does not allow the intake of the fresh water from the fresh water pipe until the button is actuated by the user.

Unwanted water is delivered to the toilet tank from at least two sources and led into the tank by gravity through a conduit. An adjacent sink drain provides gray-water. Users by control of a lever can divert used fresh water from the faucet, now gray-water as it passes through the sink basin drainage, either into the sewer line or into a conduit leading to the toilet tank. Control of the use of this lever in the sink drain allows the user to avoid unwanted debris or fluids, such as hairs, shaving cream, cleaning agents etc., from entering the toilet tank. The second mentioned source within the application is the use of unwanted water from the hot water line. Water that is not at a desired temperature is diverted via a manual, automatic or thermally activated valve with preset temperature tolerances into a conduit or pipe leading to the toilet tank via gravity. This water that naturally cools while sitting in the conduit waiting for use would otherwise often sent into the sewer while waiting for hot water to become available through the conduit. In this system the cooled or undesired water in the hot water line is bled off into the toilet tank for use in the flushing of waste. Further, users can shut off fresh water from entering the toilet by use of the manual valve in the fresh water line and rely solely on the supply of unwanted water and gray-water for operation of the toilet.

DETAILED DESCRIPTION OF THE DRAWINGS

Reference will now be made in detail to the exemplary embodiment(s) of the invention, examples of which are illustrated in the accompanying drawings.

Figure 1:
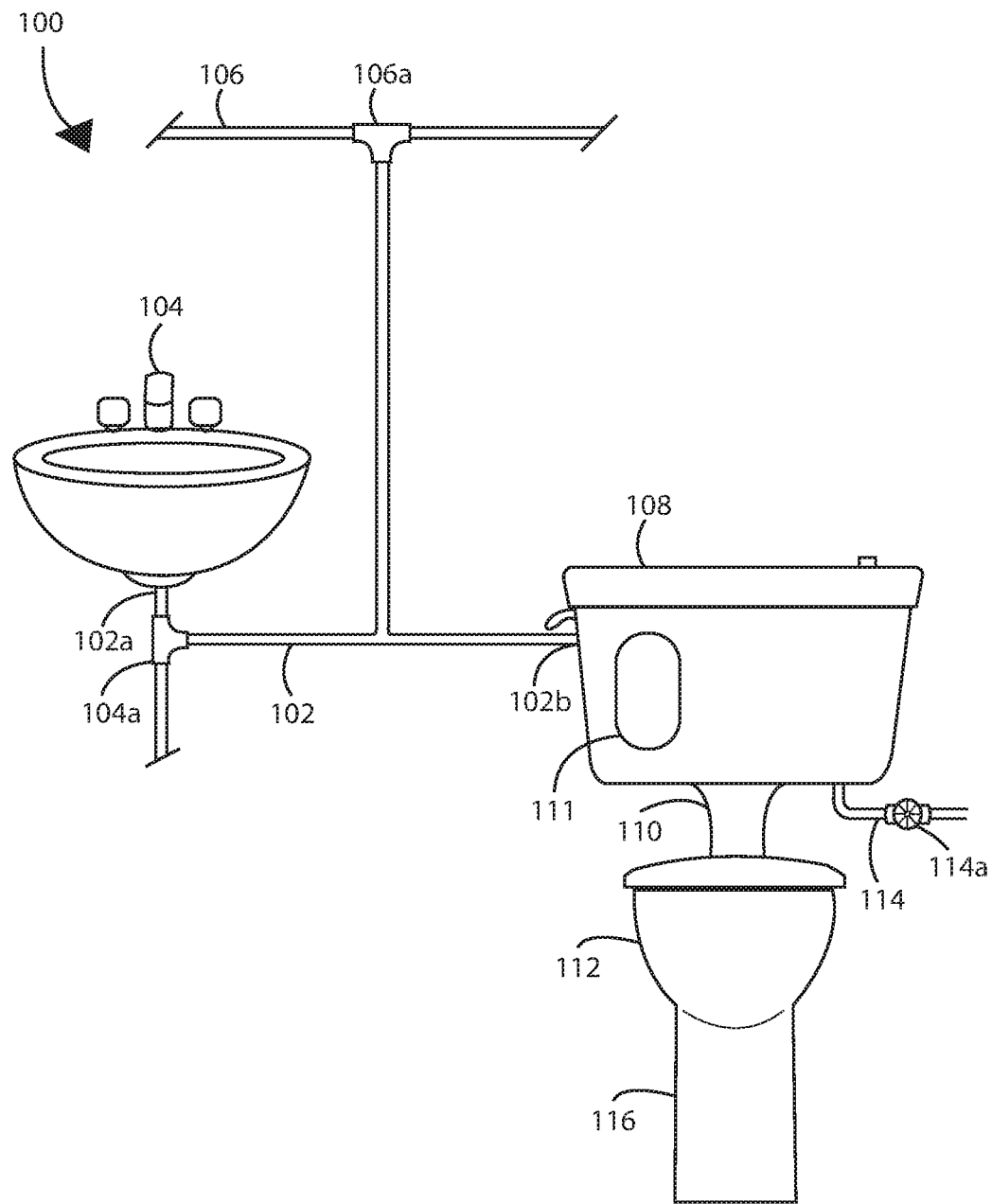
FIG. 1 illustrates the front view of the water disposable system 100.

FIG. 1 illustrates the front view of the water disposable system 100. The water disposable system 100 comprises a connecting member 102, wherein the first end 102a of the connecting member 102 is coupled to a sink 104 having valve 104a & a hot water line 106 having valve 106a and the second end 102b of the connecting member 102 is coupled to a water tank 108 which is further coupled to a disposable pipe 110 and a toilet 112, wherein the toilet 112 is coupled to a sewage pipe 116. The water tank 108 has a gauge 111 to view the level of unwanted or fresh water inside the water tank 108 allowing the user to determine if there is need for more water in the tank 108 and is also coupled to a fresh water inlet 114 having a valve 114a to control the flow of the fresh water inside the water tank 108.

Figure 2:
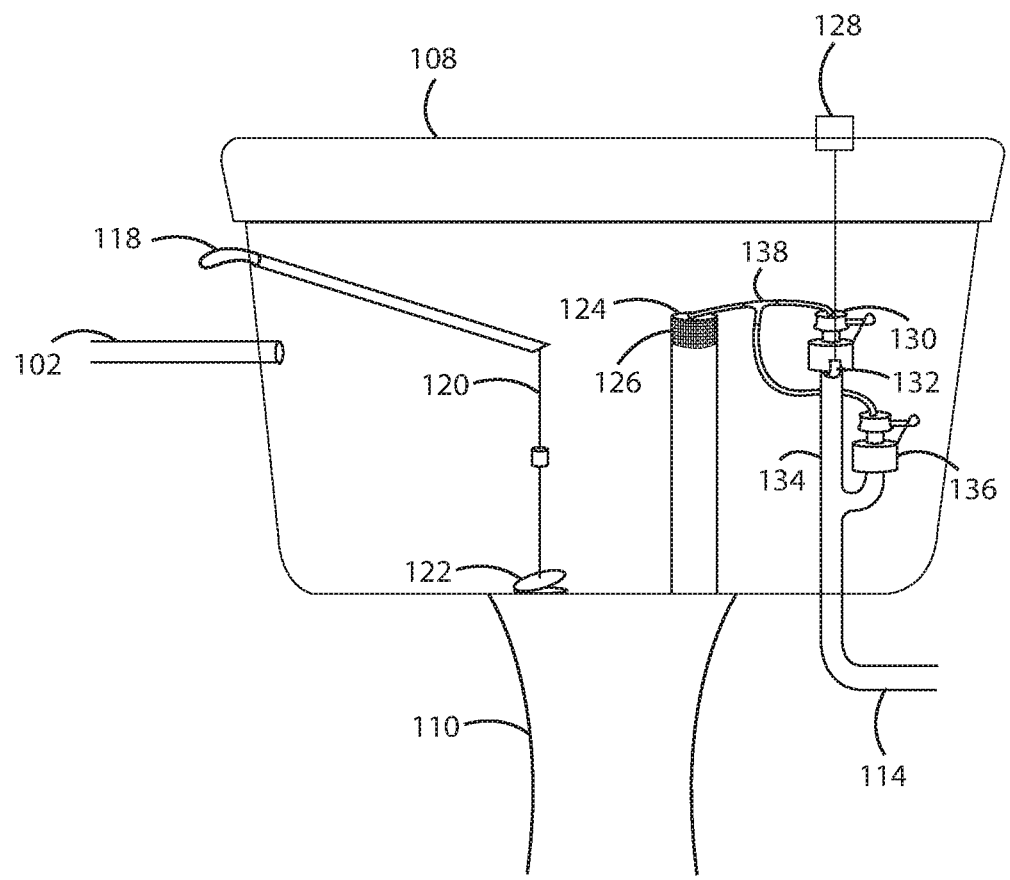
FIG. 2 illustrates the front view of the water tank 108.

FIG. 2 illustrates the front view of the water tank 108. The water tank 108 comprises a lever 118 coupled to a rubber flap 122 through a chain 120. 122 is a rubber flap which opens when pulled by the actuation of the lever 118 and enables the user to drain the water from the water tank 108 into the disposable pipe 110. The water tank 108 further comprises a stand pipe 124 having a strainer 126, wherein a strainer 126 enables the straining of debris from the unwanted water and gray-water in the water tank 108. The stand pipe 124 is coupled to the second float 130 through a hose 134. The second float 130 having a hook 132 is coupled to the ballcock body, wherein the ballcock body is further coupled to the fresh water inlet 134, 114 for enabling the entrance of the fresh water into the water tank 108. The button 128 coupled to the second float 130 enables the flow of the fresh water into the water tank 108 through the ballcock body 134. The first float 136 is coupled to the fresh water intake within the tank 134 and coupled to the standpipe 124 through a hose. The first float acts to maintain a minimum volume of water within the tank 108 to enable a flush of liquid waste.

In the preferred embodiment, the user (not shown) releases the unwanted water from at least one unwanted water source into the first end 102a of the connecting member 102, wherein the unwanted water source is at least one of sink 106, shower, tube, washing machine, initial cold water of the hot water line 106 or any other gray-water or unwanted water source and the connecting member 102 is at least one of a pipe or a hose. The user is enabled to control the flow of unwanted water through the valves coupled to each unwanted water source such as valve 106a is to control the flow of unwanted or cold water through the hot water line 106, wherein the valve is either a manual valve or a thermally activated valve. The unwanted water enters the water tank 108 through the second end 102b of the connecting member 102. For releasing the unwanted water into the toilet 112 the user actuates the lever 118. The lever 118 which is connected to the rubber flap 122 through the chain 120 enables the opening of the rubber flap 122 for releasing the unwanted water into the toilet through the disposable pipe 110. The strainer 126 coupled to the stand pipe 124 enables the deposition of the debris from the unwanted water, therefore cleaning the unwanted water of debris before draining into the toilet.

To allow the toilet to function solely on the use of gray-water or unwanted water the fresh water shut off valve 114a is closed. This prevents float one 136 and float two 130 from filling the tank and toilet bowl through the standpipe 124 even when the float lever is opened due to low water levels in the tank.

In a situation where insufficient unwanted or gray-water is unavailable the user actuates button 128 to release the hook 132 from the second float 130 to allow fresh water to fill the tank until the float is raised closing the attached lever. The fresh water enters the water tank 108 through the fresh water conduit within the tank 134. The hook 132 coupled to the second float 130 restrict its movement and thus blocks the entrance of the fresh water into the water tank 108. The actuation of the button 128 enables the hook 132 to move away from the second float 130 and thus releasing the second float 130 from its initial position. The change in the position of the second float 130 enables the fresh water to enter the water tank 108 through the ballcock body 134. In a situation of use, the user actuates the lever 118 to open the rubber flap 122 for draining the fresh water from the disposable pipe 110 into the toilet 112. The first float 136 is allowed to function freely, when the water level in the tank is below the first float 136 it opens the lever allowing fresh water from the fresh water intake within the tank 134 to flow through the attached hose into the tank and standpipe 124 into the toilet. When the water level is above the first float 136 the lever closes off intake of fresh water from the fresh water intake within the tank 134.

Although the exemplary embodiments of the present invention have been described for illustrative purposes, those skilled in the art will appreciate the alternatives of the proposed invention which falls within the scope of the invention.

What is claimed is:

1. A water disposable system comprising:
   a connecting member, wherein a first side of the connecting member is connected to at least one unwanted water source and comprises at least one valve to control the flow of an unwanted water;
   a toilet water tank, connected to a second side of the connecting member to receive unwanted water and is further enabled to receive fresh water from a fresh water pipe, wherein the water tank comprises:
   a strainer in a stand pipe to filter debris from the unwanted water, wherein the strained water is enabled to flow through the stand pipe to a flush pipe;
   a two float system, wherein a first float is set at a minimum tank volume water line to flush waste to enable fresh water to flow into the tank via a lever in communication with the first float, and a second float set at maximum tank volume water line to flush waste in communication with a lever to allow fresh water to flow into the tank up to the top position of the second float at the minimum tank volume water line to flush solid waste;
   a button, wherein a first end of the button is enabled to be actuated by the user to flush the fresh water from the water tank and a second end of the button is coupled with a second float, wherein the second float does not allow the intake of the fresh water from the fresh water pipe until the button is actuated by the user; and
   a window or gauge, wherein a transparent material is positioned on the front wall of the tank enabling the user to determine the volume of water in the toilet tank.

2. The water disposable system of claim 1, wherein the connecting member is a pipe or a hose.

3. The water disposable system of claim 1, wherein the unwanted water source is at least one of sink, shower, tube, washing machine, initial cold water of the hot water line or any other grey water.

4. The water disposable system of claim 1, wherein the water tank is a toilet tank.

5. The water disposable system of claim 1, wherein the valve is either a manual valve or a thermally activated valve.

6. The water disposable system of claim 1, wherein the excess water of the water tank is discharged into sewerage through a second pipe.

7. A toilet water tank, connected to a second side of the connecting member to receive unwanted water and is further enabled to receive fresh water from a fresh water pipe, wherein the water tank comprises:
- a strainer in a stand pipe to filter debris from the unwanted water, wherein the filtered water is enabled to flow through the stand pipe to a flush pipe;
- a two float system, wherein a first float is set at a minimum tank volume water line to liquid waste to enable fresh water to flow into the tank via a lever in communication with the first float, and a second float set at maximum tank volume water line to flush waste in communication with a lever to allow fresh water to flow into the tank up to the top position of the second float at the minimum tank volume water line to flush solid waste;
- a button, wherein a first end of the button is enabled to be actuated by the user to flush the fresh water from the water tank and a second end of the button is coupled with a second float, wherein the second float does not allow the intake of the fresh water from the fresh water pipe until the button is actuated by the user; and
- a window or gauge, wherein a transparent material is positioned on the front wall of the tank enabling the user to determine the volume of water in the toilet tank.

8. The water disposable system of claim 7, wherein the unwanted water source is at least one of sink, shower, tube, washing machine, initial cold water of the hot water line or any other grey water.

9. The water disposable system of claim 7, wherein the excess water of the water tank is discharged into sewerage through a second pipe.

* * * * *